(12) United States Patent
Beilliard et al.

(10) Patent No.: US 8,925,332 B2
(45) Date of Patent: Jan. 6, 2015

(54) ANTI-FIRE SEAL ASSEMBLY AND NACELLE COMPRISING SUCH A SEAL

(71) Applicant: Aircelle, Gonfreville l'Orcher (FR)

(72) Inventors: Stephane Beilliard, Toulouse (FR); Alexandre Phi, Shanghai (CN)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 14/040,972

(22) Filed: Sep. 30, 2013

(65) Prior Publication Data

US 2014/0026582 A1 Jan. 30, 2014

Related U.S. Application Data

(63) Continuation of application No. PCT/FR2012/050527, filed on Mar. 14, 2012.

(30) Foreign Application Priority Data

Mar. 30, 2011 (FR) ...................... 11 52620

(51) Int. Cl.
| | |
|---|---|
| *F02C 7/20* | (2006.01) |
| *F02K 1/06* | (2006.01) |
| *B64D 29/00* | (2006.01) |
| *F02C 7/25* | (2006.01) |
| *F02C 7/28* | (2006.01) |
| *F02K 1/80* | (2006.01) |

(52) U.S. Cl.
CPC . *F02K 1/06* (2013.01); *B64D 29/00* (2013.01); *F02C 7/25* (2013.01); *F02C 7/28* (2013.01); *F02K 1/805* (2013.01); *F05D 2240/14* (2013.01); *F05D 2240/59* (2013.01); *Y02T 50/672* (2013.01)

USPC ............... 60/799; 60/770; 60/771; 60/796; 277/644; 277/634; 277/391; 239/265.11

(58) Field of Classification Search
USPC ............... 60/770, 771, 799, 796; 277/644, 277/634–635, 637, 630, 370, 391; 239/265.11

See application file for complete search history.

(56) References Cited

U.S. PATENT DOCUMENTS

| | | | |
|---|---|---|---|
| 2,613,087 A | 10/1952 | Alford | |
| 4,084,634 A * | 4/1978 | Handa | ................. 165/9 |
| 4,453,722 A * | 6/1984 | Swanson | ................. 277/379 |
| 4,813,608 A * | 3/1989 | Holowach et al. | ........ 239/265.37 |
| 5,524,846 A | 6/1996 | Shine et al. | |
| 6,227,546 B1 * | 5/2001 | Halling | ......................... 277/312 |
| 6,450,672 B2 * | 9/2002 | Gismondi | ..................... 362/427 |

(Continued)

FOREIGN PATENT DOCUMENTS

| | | |
|---|---|---|
| EP | 0838615 A2 | 4/1998 |
| WO | 2006/000781 A1 | 1/2006 |

OTHER PUBLICATIONS

PCT/FR2012/050527 International Search Report.

*Primary Examiner* — Phutthiwat Wongwian
*Assistant Examiner* — Steven Sutherland
(74) *Attorney, Agent, or Firm* — Brinks Gilson & Lione

(57) ABSTRACT

A seal assembly for a turbojet nacelle includes a first end fastened to a first structure, and a second end contacting against a bearing zone of a second structure. The seal assembly further includes a plurality of adjacent blades arranged along the first end and extending longitudinally and perpendicularly thereto. In particular, a portion of the blades has an accordion-shaped structure.

12 Claims, 3 Drawing Sheets

(56) References Cited

U.S. PATENT DOCUMENTS

Figure 1:
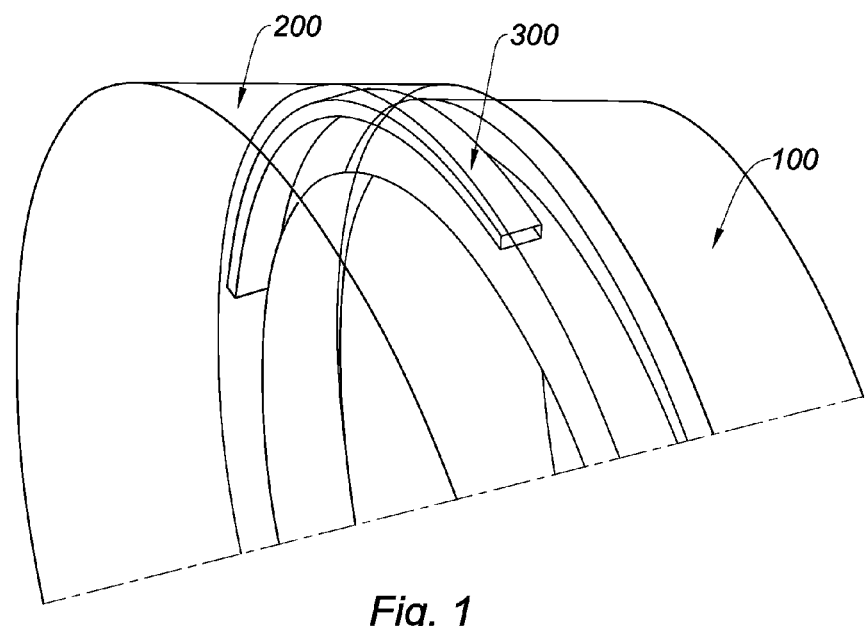

| | | | |
|---|---|---|---|
| 6,547,257 B2 * | 4/2003 | Cromer | 277/630 |
| 6,792,763 B2 * | 9/2004 | Sileo et al. | 60/796 |
| 6,834,507 B2 * | 12/2004 | Jorgensen | 60/800 |
| 7,086,219 B2 * | 8/2006 | Stretton et al. | 60/226.1 |
| 2005/0073114 A1 * | 4/2005 | Amos et al. | 277/644 |

* cited by examiner

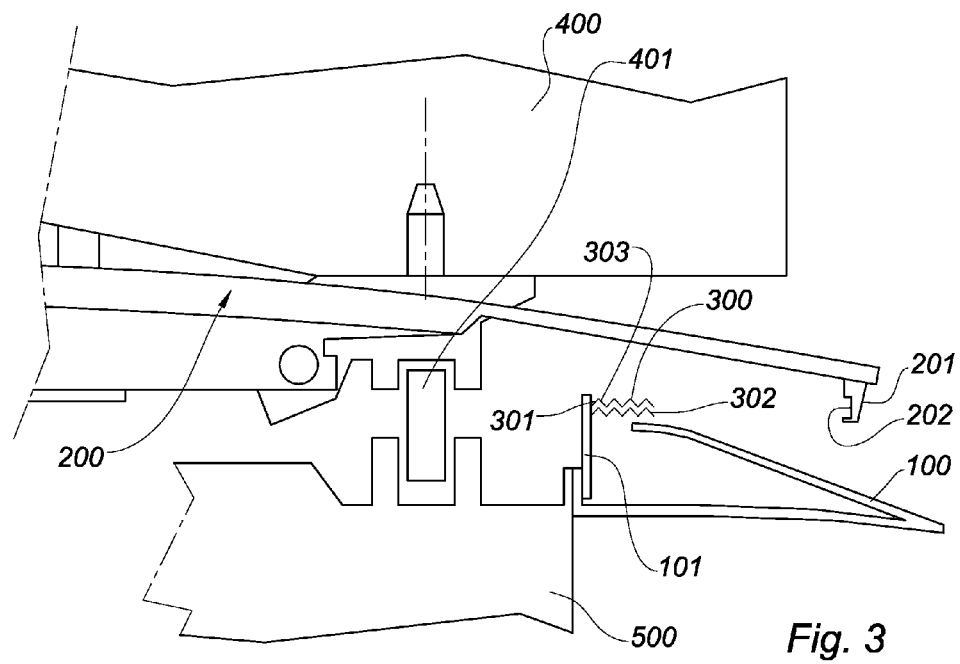
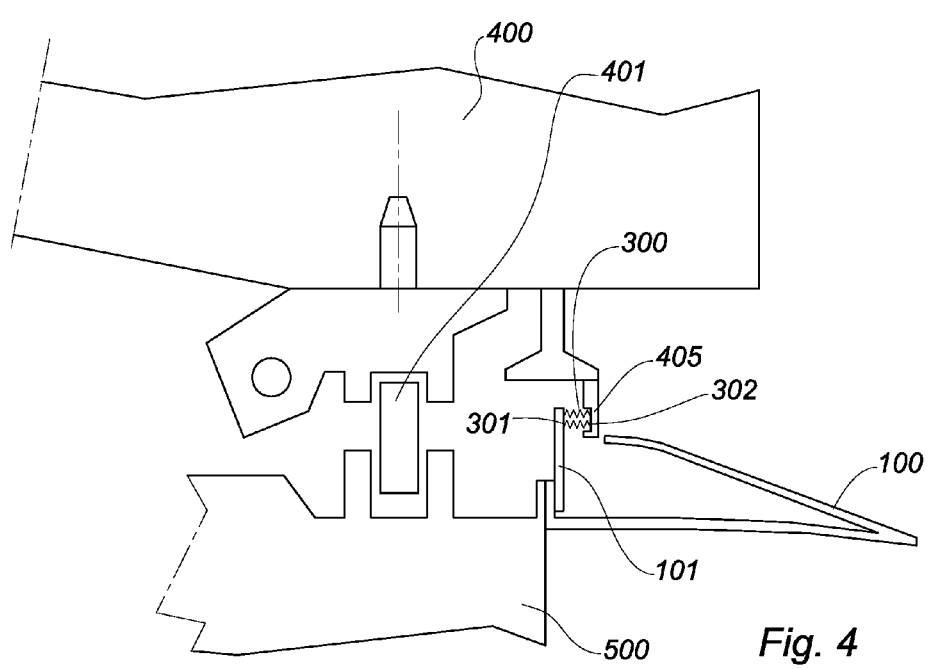

ANTI-FIRE SEAL ASSEMBLY AND NACELLE COMPRISING SUCH A SEAL

CROSS-REFERENCE TO RELATED APPLICATIONS

This application is a continuation of International Application No. PCT/FR2012/050527, filed on Mar. 14, 2012, which claims the benefit of FR 11/52620, filed on Mar. 30, 2011. The disclosures of the above applications are incorporated herein by reference.

FIELD

The present disclosure relates to a seal assembly for a turbojet jet engine nacelle for an aircraft, as well as a nacelle equipped with such a seal.

BACKGROUND

The statements in this section merely provide background information related to the present disclosure and may not constitute prior art.

An aircraft is moved by several turbojet engines each housed in a nacelle also housing a set of related actuating devices connected to its operation and performing various functions, when the turbojet engine is operating or stopped.

The nacelle generally has a tubular structure comprising an air intake in front of the turbojet engine, a middle section designed to surround a fan of the turbojet engine, and a rear section designed to surround the combustion chamber of the turbojet engine and able to house thrust reverser means.

Modern nacelles are often designed to house a dual flow turbojet engine capable of generating, by means of the rotating fan blades of the compressor, a hot air flow (also called primary flow) coming from the combustion chamber of the turbojet engine and turbine. The assembly of the compressor, combustion chamber and turbine constitutes a gas generator of the turbojet engine, also called the core.

Thus, a nacelle generally comprises an outer structure, which defines, with a concentric inner structure of the rear section called the Inner Fixed Structure (IFS) surrounding the core of the turbojet engine behind the fan, an annular flow channel, also called a secondary tunnel, aiming to channel a cold air flow, called secondary flow, that circulates outside the turbojet engine.

The rear structure of the core of the turbojet engine ends with a so-called primary jet nozzle ensuring the discharge of the hot air flow, the outer structure of the nacelle generally ending with a secondary jet nozzle, which may have a variable section and optimizing the discharge of the cold secondary flow.

The inner structure thus constitutes a cowling around the core of the turbojet engine and may be referred to using different names, in particular Aft Core Cowl (ACC).

The core cowl and the primary jet nozzle are two separate structures that may in particular move relative to one another, for example due to longitudinal expansion phenomena, variations in flight conditions, or the geometry of the assembly. Transverse movements also exist between the core cowl and attachment pylon of the nacelle.

The structures may also in certain cases be separable from one another for maintenance purposes. The core cowl may in particular be able to be disassembled and removed, so as to allow an access to the core of the turbojet engine. One of the disassembly/movement solutions of the core cowl in particular involves rear translation of the assembly. The primary jet nozzle may also be able to be disassembled so as for example to facilitate its replacement if necessary.

The rear of the turbojet engine is also generally attached to the pylon at the rear attachment point and the interface with the primary jet nozzle may also be produced at the area of that rear attachment point. The primary jet nozzle/pylon interface therefore constitutes an interface zone which, although having a slightly different behavior, in particular due to the fact that the relative longitudinal movements vary, is also affected by the aforementioned problems.

A seal is therefore provided between said aft core cowl and the primary jet nozzle, and/or between the pylon and the primary jet nozzle, said seal being deformable so as to account for the primarily longitudinal and transverse relative movement phenomena to a lesser extent.

Furthermore, the certification constraints for propulsion assemblies require fire protection in an upper 90° quadrant, i.e., 45° on either side of a substantially vertical axis, between the engine core compartment and the outside of the nacelle.

This seal must therefore also provide fire protection between the engine core cowl, the primary jet nozzle and the pylon, so as to avoid the spread of the fire toward or from the engine.

The seals currently used at such interfaces are generally seals of the finger seal type made up of a double row of thin metal strips fixed either to the primary jet nozzle or to the engine core cowl and rubbing on a bearing surface of the opposite part (the core cowl or the primary jet nozzle, respectively).

Examples of such seals are described in particular in document U.S. Pat. No. 5,910,094.

Of course, due to the aforementioned relative movements, these blades undergo friction and in particular a metal/metal contact that leads to significant and often premature wear of the seals.

Known in the state of the art is a solution based on the use of a deformable P seal or Ω seal with a more or less circular section, fixed to one of the parts and bearing or rubbing on the opposite component. Such a seal is described in document WO2006000781 using the term Z seal.

The mounting principle of such a seal and the related flight conditions often mean that, to operate in a normal crushing range known by those skilled in the art, it must have large dimensions, and in particular a large diameter. These dimensions then make it heavy, difficult to install and subject to significant deformation and wear that may lead to damage thereof and thereby compromise its mission as a fire protection barrier.

SUMMARY

The present disclosure provides a seal assembly for a turbojet nacelle comprising a first end equipped with means for fastening to a first structure, and a second end designed to come into contact against a bearing zone of a second structure, the seal assembly comprising a plurality of adjacent blades arranged along the first end and extending substantially longitudinally and substantially perpendicularly thereto, characterized in that at least a portion of the blades has an accordion-shaped structure.

Thus, by implementing a seal structure having a finger seal structure and equipped with accordion blades, practically all of the relative movements of the structures may be taken into account.

More specifically, the relative longitudinal movements will easily be damped by compressing or relaxing the accordion blades, which are therefore no longer subject to a sliding contact generating friction and wear.

It has also been noted that an accordion structure for the blades makes it possible to account for the relative sideways movements while likewise limiting the sideways sliding and friction.

Generally speaking, the relative movements are thus absorbed inside the seal assembly itself, and no longer by means of a friction interface, without reducing the relative movement freedom or the fire sealing.

In one form, at least some of the blades are metal.

Alternatively or complementarily, at least some of the blades are made from a deformable elastic material, of the polymer, rubber or composite type.

In another form, the second end designed to come into contact on a bearing zone of the second structure assumes the form of an interface plate, which may be continuous or discontinuous in pieces.

Alternatively or complementarily, the second end designed to come into contact on a bearing zone of the second structure comprises elastic bearing beads.

Advantageously, the second end is designed to come into contact on a bearing zone of the second structure through a non-sliding contact.

In still another form, the seal assembly comprises two or more rows of blades.

Advantageously, the blades of the rows are laterally or circumferentially offset with respect to one another. In this way, "baffles" are formed between the blades of the rows, which increases the fire sealing.

Still advantageously, the rows of blades are spaced apart enough to allow compression and release of the accordions without interfering with an adjacent row.

The present disclosure also relates to a turbojet engine nacelle comprising at least one engine core cowl and at least one primary jet nozzle, characterized in that at least part of the interface between the engine core cowl and the primary jet nozzle is equipped with at least one seal assembly according to the present disclosure.

According to a first alternative form, the first end of the seal assembly is fixed in the core cowl.

Complementarily, the turbojet engine nacelle comprises at least one attachment pylon of the nacelle and at least one primary jet nozzle, characterized in that at least part of the zone between the pylon and the primary jet nozzle is equipped with at least one seal assembly according to the present disclosure.

According to one alternative form, the first end of the seal assembly is fixed on the pylon.

Alternatively, the first end of the seal assembly is fixed on the primary jet nozzle.

In another form, the part of the interface equipped with the seal assembly comprises at least one upper part extending on either side of the plane of an attachment pylon.

Further areas of applicability will become apparent from the description provided herein. It should be understood that the description and specific examples are intended for purposes of illustration only and are not intended to limit the scope of the present disclosure.

DRAWINGS

Figure 2:
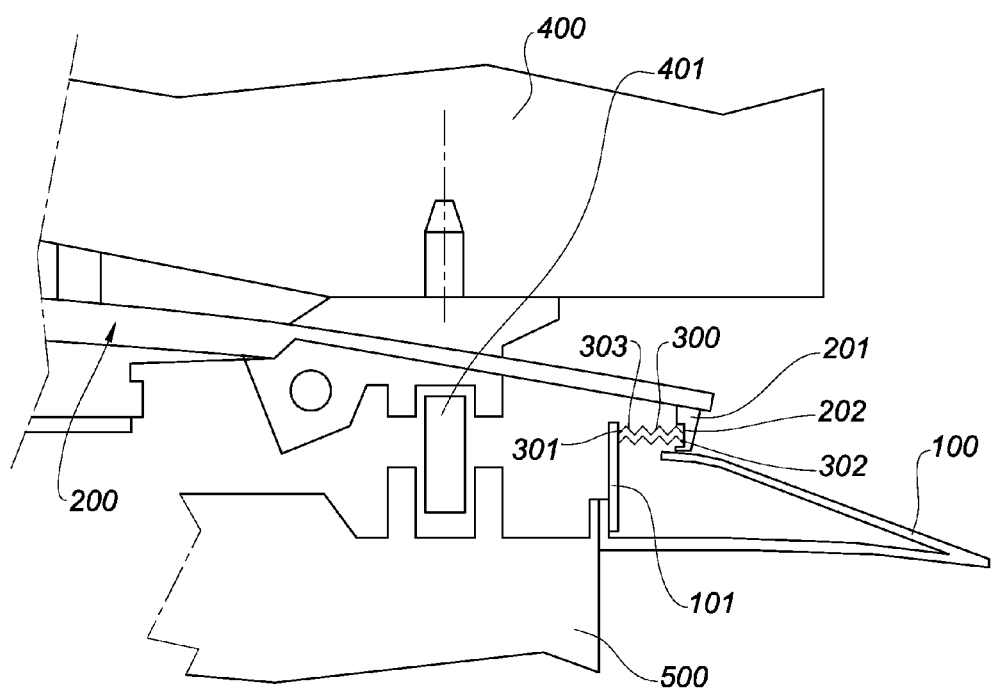
Figure 5:
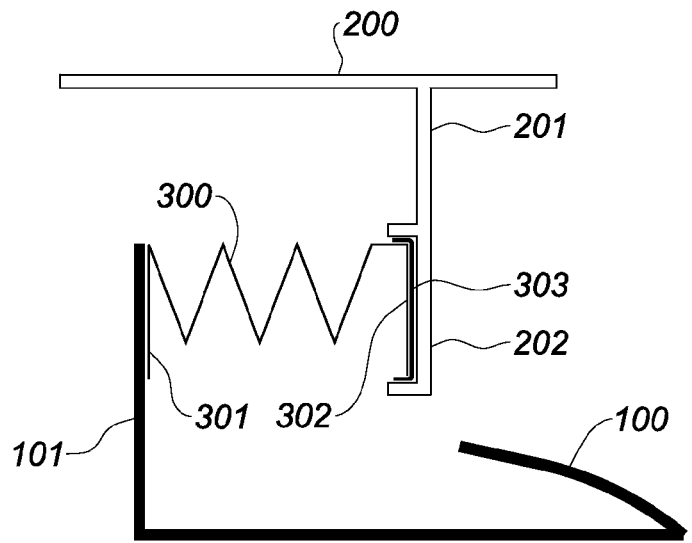
Figure 6:
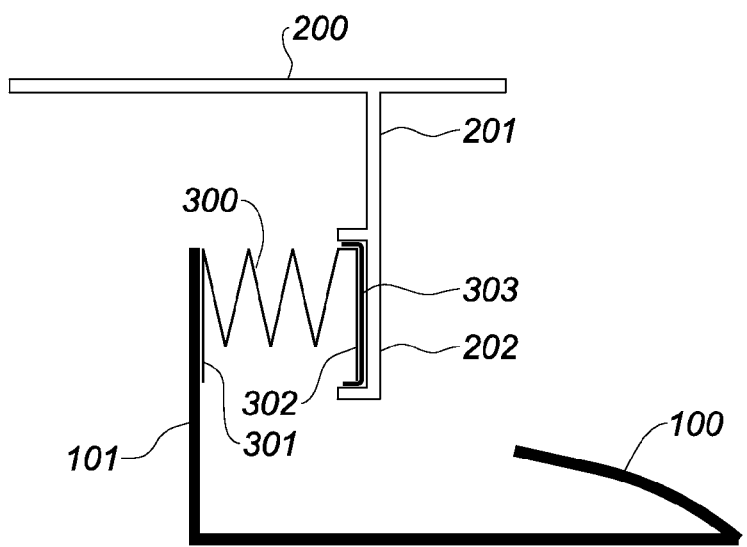
Figure 7:
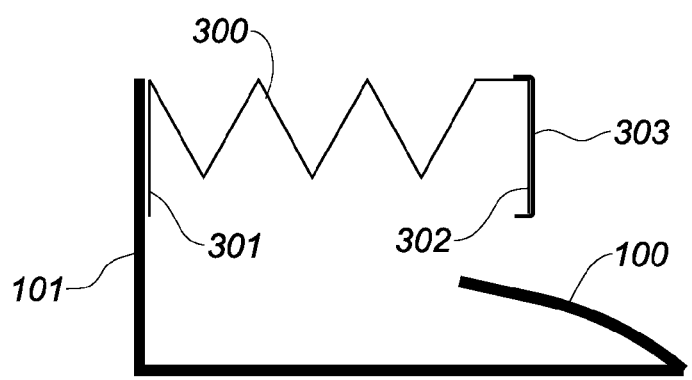

In order that the disclosure may be well understood, there will now be described various forms thereof, given by way of example, reference being made to the accompanying drawings, in which:

The present disclosure will be better understood in light of the detailed description that follows, with respect to the appended drawing, in which:

FIG. 1 is a partial diagrammatic illustration of a rear inner part of a turbojet engine nacelle showing an interface between a primary jet nozzle and a pylon/core cowl zone equipped with an anti-fire seal according to the present disclosure;

FIGS. 2 to 4 are diagrammatic longitudinal cross-sectional illustrations of the zone of FIG. 1, the seal according to the present disclosure respectively being installed on the core cowl (FIGS. 2 and 3), and on the pylon support (FIG. 4); and FIGS. 5 to 7 are diagrammatic illustrations of the operation of a seal according to one alternative of the present disclosure in the rated, compressed, and free configurations, respectively.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a partial diagrammatic illustration of the rear inner part of a turbojet engine nacelle showing an interface between a primary jet nozzle 100 and a core cowl 200, said interface being equipped in the upper part thereof with an anti-fire seal 300 extending on both sides around a substantially transverse plane corresponding to an attachment plane to a pylon (not shown), most often, a plane that is consequently substantially vertical.

It will be noted that although the core cowl 200 is primarily situated upstream from the primary jet nozzle 100, it comes into contact with the seal 300 downstream therefrom by means of a downstream return 201 of the core cowl 200. Reciprocally, the primary jet nozzle 100, although situated downstream from the core cowl 200, comes into contact with the seal 300 by the upstream area thereof, by means of an upstream return 101 of the jet nozzle.

In this way, the core cowl 200 remains easily translatable in the downstream direction, above the primary jet nozzle 100.

The operation and situation of the seal 300 are shown in more detail in FIGS. 2 and 3.

FIGS. 2 and 3 are diagrammatic longitudinal cross-sectional illustrations of the zone of FIG. 1 showing a downstream suspension fork 401 for a pylon 400 supporting the rear part of a turbojet engine 500 whereof a downstream end ends with the primary jet nozzle 100.

This rear part of the turbojet engine 500 is surrounded by a core cowl 200 mounted translatably toward the rear of the turbojet engine.

As previously described, the seal 300 equips an upper part of the interface between the core cowl 200 and the primary jet nozzle 100.

The seal 300 comprises a first end 301 fixed in the upstream return 101 of the primary jet nozzle 100 and a second end 302 designed to come into contact against a bearing zone 202 formed in the downstream return 201 of the core cowl 200.

According to the present disclosure, the seal 300 comprises a plurality of adjacent blades 303 positioned along the first end and extending substantially longitudinally and substantially perpendicularly thereto.

Still according to the present disclosure, at least some of the blades 303 have an accordion structure.

According to alternative forms, some or all of the blades may be metallic and/or made from a deformable elastic material of the rubber or composite type.

According to the illustrated example, the seal 300 comprises two rows of blades radially spaced apart, and in particular sufficiently spaced apart to allow the compression of the blades 303 of each row without bother.

Advantageously, the blades 303 of the two rows will be laterally or circumferentially offset with respect to one another so as to form baffles.

It will also be noted that in order to improve the resistance of the seal 300, the second end, designed to come into contact with the core cowl 200, may be made in the form of an interface plate 302, which may be continuous or discontinuous in pieces, connecting a plurality of ends of the blades 303 to each other.

The interface plates 302 may be equipped with elastic bearing beads making it possible, if applicable, to improve the non-sliding nature of the bearing end.

FIG. 4 shows an alternative installation of the seal 300 according to the present disclosure, differing by the fact that the seal 300 is positioned at an interface between the primary jet nozzle 100 and the pylon 400, by means of a return having a bearing zone 405.

FIGS. 5 to 7 are diagrammatic illustrations of the operation of a seal according to the present disclosure respectively in the rated, compressed and free configurations.

What is claimed is:

1. A seal assembly for a turbojet nacelle, comprising:
   a first end equipped with means for fastening to at least a first structure of the turbojet nacelle;
   a second end configured to come into contact against a bearing zone of a second structure of the turbojet nacelle; and
   at least two rows of blades each comprising a plurality of adjacent blades arranged along the first end and extending substantially longitudinally and substantially perpendicularly thereto,
   wherein at least one of the plurality of adjacent blades has an accordion-shaped structure, wherein said at least two rows of blades are radially spaced apart from each other with respect to a longitudinal axis of the adjacent blades, wherein said two rows of blades are circumferentially distributed around said longitudinal axis, and wherein said two rows of blades are configured to allow compression and release of the accordion-shaped structure without interfering with an adjacent row.

2. The seal assembly according to claim 1, wherein at least some of the plurality of adjacent blades are metal.

3. The seal assembly according to claim 1, wherein at least some of the plurality of adjacent blades are made from a deformable elastic material, of the polymer, rubber or composite type.

4. The seal assembly according to claim 1, wherein the second end configured to come into contact on the bearing zone of the second structure is made in a form of an interface plate, which is continuous or discontinuous in pieces.

5. The seal assembly according to claim 1, wherein the second end configured to come into contact on the bearing zone of the second structure through a non-sliding contact.

6. A turbojet engine nacelle comprising at least one engine core cowl and at least one primary jet nozzle, wherein at least part of an interface between the engine core cowl and the primary jet nozzle is equipped with at least one seal assembly according to claim 1.

7. The turbojet engine nacelle according to claim 6, wherein the first end of the seal assembly is fixed in the at least one engine core cowl.

8. The turbojet engine nacelle according to claim 6, further comprising at least one attachment pylon of the nacelle, wherein at least part of a zone between the pylon and the primary jet nozzle is equipped with at least one seal assembly according to claim 1.

9. The turbojet engine nacelle according to claim 8, wherein the first end of the seal assembly is fixed on the attachment pylon.

10. The turbojet engine nacelle according to claim 6, wherein the first end of the seal assembly is fixed on the primary jet nozzle.

11. The turbojet engine nacelle according to claim 6, wherein the at least part of the interface equipped with the seal assembly comprises at least one upper part extending on either side of a plane of an attachment pylon.

12. The seal assembly according to claim 1, wherein each of the plurality of adjacent blades has an accordion-shaped structure.

* * * * *